Patented Sept. 2, 1952

2,609,353

UNITED STATES PATENT OFFICE 2,609,353

POLYMERIZABLE COMPOSITION OF STYRENE, UNSATURATED ALKYD RESIN, AND ELASTOMER

Louis C. Rubens and Raymond F. Boyer, Midland, Mich., assignors to The Dow Chemical Company, a corporation of Delaware No Drawing. Application July 10, 1946, Serial No. 682,593

6 Claims. (Cl. 260—45.4)

This invention relates to improved vinyl aromatic resins and resin-forming compositions.

The interpolymerization of styrene with roughly equal or larger proportions of an unsaturated alkyd resin produces plastic materials which are used commercially as laminating and casting resins. However, the monomeric compositions are comparatively expensive, and the polymeric products have dielectric characteristics which limit their usefulness as insulating materials where radio-frequency currents are involved.

It is accordingly an object of the invention to provide improved vinyl aromatic laminating and casting compositions which are materially less expensive than those heretofore used for these purposes and which polymerize rapidly to resins having excellent physical and electrical properties.

The invention is based on the discovery that a small proportion of an unsaturated alkyd resin markedly accelerates the rate of polymerization of styrene and other monovinyl aromatic compounds, and that the resulting polymers possess very desirable physical properties while largely retaining the excellent dielectric characteristics of the pure vinyl aromatic polymers. By taking advantage of this discovery, a number of exceptional laminating and casting resin compositions may be formulated.

In so far as known, the catalytic effect of unsaturated alkyd resins is observed in the polymerization of polymerizable monovinyl aromatic compounds generally. Typical of such materials are the monovinyl aromatic hydrocarbons and halohydrocarbons such as styrene, p-ethyl styrene, dimethyl styrene, p-chlorostyrene, dichlorostyrene, and vinyl naphthalene. Styrene is at present of principal commercial importance.

The term "unsaturated alkyd resin," following conventional practice, is here used to refer to the unmodified and modified polyhydric alcohol polyesters of alpha-unsaturated-alpha-beta-polycarboxylic acids. Typical of the polyhydric alcohols used in making such resins are ethylene glycol, di-, tri-, and tetra-ethylene glycol, propylene glycol, dipropylene glycol, trimethylene glycol, glycerol, and pentaerythritol. Examples of the alpha-unsaturated-alpha-beta-polycarboxylic acids are maleic, fumaric, chloromaleic, chlorofumaric, citraconic and mesaconic acids. In making the unmodified unsaturated alkyd resins, one or more of the foregoing alcohols is heated with a roughly equivalent proportion of one or more of the acids named, their anhydrides, or compounds which liberate the acids, for a time sufficient to complete condensation to a resinous polyester. In making modified unsaturated alkyd resins, a part, or even nearly all, of the unsaturated polycarboxylic acid may be replaced by a saturated poly- or mono-carboxylic acid, such as succinic, adipic, phthalic, sebacic, or 12-hydroxy stearic acid. Such resins, both unmodified and modified, are available commercially under a variety of trade-names.

It will be noted that the molecule of each unsaturated alkyd resin contains the functional grouping

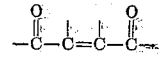

repeated along the polyester chain. The presence of this group is thought to account for the catalytic activity of the unsaturated alkyd resin, since it has been observed that the more frequent the occurrence of the group in the resin, the greater the catalytic effect, i. e. the unmodified unsaturated alkyd resins are more active than the modified resins. It is essential that the active group be repeated along the chain, i. e. that the polyester consist of a number of alcohol and acid units. The simple esters, obtained by condensation of a single polyhydric alcohol molecule with a single polycarboxylic acid molecule, show no catalytic effect. With the polyesters, the activity increases as the molecular weight of the polyester increases. In general, those unsaturated alkyd resins having a molecular weight, as measured by the acid value of the resin, over 500 are quite effective, with molecular weights over 1000 being preferred.

The proportion of unsaturated alkyd resin required to catalyze the polymerization of vinyl aromatic compounds is not large, as low as 0.5 per cent by weight of the total polymerizable material being effective. Increasing proportions of the resin give a somewhat greater effect. In general, not over 10 per cent of resin should be used, since larger amounts may impair the dielectric properties of the polymer; 1 to 5 per cent is preferred. With those unsaturated alkyd resins which are not soluble in vinyl aromatic compounds to the extent of 10 per cent, it is well to limit the amount of resin to that which will dissolve readily. Modified resins are somewhat more soluble than the unmodified ones.

Small proportions of unsaturated alkyd resins are not only active per se in catalyzing the polymerization of vinyl aromatic compounds, but they are also effective in accelerating the rate of polymerization of such materials in the presence of conventional polymerization catalysts. By far the best results are obtained when the unsaturated alkyd resins are used to accelerate the polymerization of vinyl aromatic compounds in the presence of organic peroxide catalysts, such as benzoyl and lauroyl peroxides. By using both an unsaturated alkyd resin and a peroxide, extremely rapid but controllable rates of polymerization may be realized and polymers of desirably high molecular weight prepared.

The unsaturated alkyd resin catalyst is not only effective in catalyzing the polymerization of monovinyl aromatic compounds alone, but is also active in the copolymerization of such compounds with lesser proportions of other polymerizable substances, i. e. in polymerizing monomeric materials generally in which a polymerizable monovinyl aromatic compound is the major polymerizable constituent.

In practice, the monovinyl aromatic compound to be polymerized, e. g. styrene, is mixed with 0.5 to 10 per cent by weight of an unsaturated alkyd resin, and another catalyst, if desired, e. g. 0.1 to 5 per cent of lauroyl peroxide, is added. The mixture is then heated at a polymerizing temperature, e. g. 50° C. or higher, until polymerization is complete.

If it is desired to store the vinyl aromatic compound-unsaturated alkyd resin mixture at room temperature before use, a small proportion of a conventional inhibitor, e. g. p-tert.-butyl catechol or hydroquinone, may be added. Such inhibitor does not destroy the catalytic effect of the unsaturated alkyd resin when polymerization is later initiated by heating.

By utilizing the principles of the invention, a number of laminating and casting resin compositions of extremely valuable properties may be formulated.

Resin-forming compositions used in making laminates with glass, cloth, paper, asbestos, or other fillers must meet a number of specifications. They should be readily applicable to the reinforcing material by dip-impregnation, brush-coating, or flowing onto the material. They must set rapidly to form tough, insoluble, heat-resistant resins. They should also have a low cost.

Such compositions may be made, according to the invention, by incorporating into a mixture of a monovinyl aromatic compound, and an unsaturated alkyd resin catalyst, a minor proportion of an elastomer. The addition of the elastomer, which should be present in a proportion of about 2 to about 15 per cent of the vinyl aromatic compound, serves to control the viscosity of the monomeric solution and also to impart great toughness and high impact strength to the polymerized product. In so far as known, any uncured elastomer may be used, although hydrocarbon elastomers, such as butyl rubber and natural rubber are preferred. The 70 per cent butadiene-30 per cent styrene emulsion copolymer, known as GR–S, is especially effective.

The usefulness of such laminating compositions may be improved by also adding a small proportion of a polymerizable polyolefinic compound, such as divinyl benzene, which, presumably by initiating cross-linking of the polymer chain molecules, causes the resin-forming mixture to gel during the initial stages of the polymerization. Such gelation serves to thicken the mixture rapidly on heating, preventing loss by flow from the material being laminated. Other cross-linking polyolefinic compounds include diallyl phthalate, allyl acrylate, diallyl ether, glycol diacrylate, and many others. Such agents also act to raise markedly the heat-distortion temperature of the resulting polymer. In general, at least 1 per cent by weight of the polyolefinic compound, and preferably 2 to 7 per cent, should be used. Values above 10 per cent should in general be avoided, since with such concentrations the polymeric product tends to be brittle.

In actual practice, the laminating compositions are made up by mixing the monovinyl aromatic compound, unsaturated alkyd resin, elastomer, and polyolefinic compound in the proportions stated. Such a composition, preferably with an inhibitor added, may be stored until ready for use. At that time, an organic peroxide catalyst is preferably added and the liquid mixture applied to the reinforcing material to be laminated. The treated material is then cured under heat and pressure in conventional manner. The dielectric properties and impact strengths of the cured resins far excel those of laminating resins heretofore available.

As already suggested, the present invention also provides for casting resins valuable for use as insulation in radio-frequency electrical equipment. Such casting compositions must be capable of polymerizing rapidly in place without excessive shrinkage when heated at very moderate temperatures. The resulting resins must have exceptional dielectric properties, and high resistance to mechanical shock, and must not flow at temperatures up to 100° C., and yet must not be brittle in extreme cold.

Casting compositions of this charatcer may be prepared, according to the invention, by adding to a mixture of a monovinyl aromatic compound and an unsaturated alkyd resin catalyst from 10 to 50 per cent by weight of an aliphatic-chain hydrocarbon polymer incompatible with the polymerized vinyl aromatic compound. Polyisobutylene, polybutadiene, polyethylene, and the 70 per cent butadiene-30 per cent styrene emulsion copolymers known as GR–S and as soluble Buna S, are typical incompatible aliphatic-chain hydrocarbon polymers, with polyisobutylene being preferred. On polymerization, such mixtures set to soft wax-like solids of excellent electrical characteristics which do not become brittle even at −40° C.

As in the case of laminating resin formulations, it is desirable to incorporate in these vinyl aromatic compound-alkyd resin-hydrocarbon polymer casting mixtures from about 1 to about 10 per cent, preferably 2 to 7 per cent, of a polymerizable polyolefinic compound, such as divinyl benzene, to insure early gelation of the monomeric mixture on heating and to raise the heat-distortion temperature of the final product.

It is also desirable, in making this type of casting composition for electrical use, to include an inert filler to limit shrinkage on polymerization. Preferred fillers should have a very low dielectric loss, such as chlorinated diphenyl resins, hydrogenated polystyrene, or hydrogenated polyindene. The filler should ordinarily represent from 10 to 50 per cent by weight of the vinyl aromatic compound.

In practice, the casting compositions are formulated by mixing the monovinyl aromatic compound, unsaturated alkyd resin, aliphatic-chain hydrocarbon polymer, polyolefinic compound, and filler in the proportions stated. Such a mixture, preferably with inhibitor added, may be stored until ready for use. At that time, an organic peroxide catalyst is preferably added and the mixture is poured into an appropriate vessel in which the electrical parts to be embedded are inserted. Moderate heat is then applied in conventional manner until the resin is cured. The dielectric properties and impact strengths of these resins much exceed those of casting resins heretofore available.

The following examples will illustrate the invention, but are not to be construed as limiting its scope.

*Example 1*

A modified unsaturated alkyd resin was prepared by heating a mixture of 5.5 mols of dipropylene glycol, 5.0 mols of maleic anhydride, and 1.0 mol of 12-hydroxy stearic acid until the mass attained the consistency of a thick syrup. The molecular weight of the resulting resin was about 3650, as estimated from the acid number of the material.

In a blank determination, pure monomeric styrene, when heated at 80° C. for 13 hours, polymerized at the rate of about 0.7 per cent per hour. A mixture of styrene with 1.0 per cent by weight of the unsaturated alkyd resin prepared as described exhibited under the same conditions a polymerization rate of 1.6 per cent per hour.

In a similar determination at 100° C. styrene polymerized at the rate of 4 per cent per hour. A mixture of styrene with 3 per cent of the unsaturated alkyd resin polymerized at 11.5 per cent per hour.

From these runs it will be noted that, in the absence of any other catalyst, the small proportion of unsaturated alkyd resin more than doubled the rate of polymerization under all conditions tested.

*Example 2*

In a series of determinations, mixtures of styrene with a number of proportions of the unsaturated alkyd resin of Example 1 were polymerized at various temperatures, all with 0.2 per cent of benzoyl peroxide as a catalyst. The following rates of polymerization were observed:

| Percent Alkyd Resin | Temperature °C. | Rate of Polymerization Percent per Hour |
|---|---|---|
| 0 | 60 | 0.8 |
| 1 | 60 | 1.9 |
| 3 | 60 | 4.0 |
| 5 | 60 | 4.0 |
| 0 | 80 | 5.4 |
| 3 | 80 | 20.6 |
| 5 | 80 | 22.3 |
| 10 | 80 | 20.0 |
| 0 | 100 | 33 |
| 1 | 100 | 69 |
| 3 | 100 | 87 |
| 5 | 100 | 100 |

From these tests, it is seen that, in the presence of a peroxide catalyst, a small proportion of unsaturated alkyd resin produces a severalfold acceleration of the rate of polymerization of styrene.

*Example 3*

An unmodified alkyd resin was prepared by heating together equimolecular proportions of triethylene glycol and maleic acid. Samples were withdrawn at intervals as the condensation proceeded, and the average molecular weight of the resin present in each sample was determined by measuring the acid number. In this way, the simple esters and polyesters of several degrees of condensation were obtained.

Each of these samples was mixed with monomeric styrene in such proportion that the ester or polyester represented 4 per cent by weight of the mixture. Lauroyl peroxide, 1 per cent by weight, was then added to each mixture, after which all were heated at 50° C. to determine the time required for each sample to gel. Gelation was taken as occurring when the resin would no longer flow under its own weight and air bubbles would not rise in the mass. The results were:

| Average Molecular Weight of Resin | Gelation Time in Hours |
|---|---|
| 290 | Did not gel.[1] |
| 340 | Did not gel.[1] |
| 500 | 5 to 5.7. |
| 700 | 4.2 to 4.7. |
| 1,200 | 3.7 to 4.2. |
| 12,000 | 2.5 to 2.7. |

[1] Solidified without gelation after 48 hours.

From these results, it is apparent that the simple ester possesses no catalytic effect, that polyesters having a molecular weight of 500 or more show activity, and that the activity increases with increasing molecular weight of the alkyd resin.

*Example 4*

A laminating resin composition was prepared from styrene, a diethylene glycol-fumaric acid unsaturated alkyd resin having a molecular weight of about 8000, a soluble Buna S rubber (70 per cent butadiene-30 per cent styrene emulsion copolymer), and a crude divinyl benzene containing about 40 per cent by weight of that material, the balance being ethyl styrene. These ingredients were mixed in the following proportions:

| Ingredient | Parts by weight |
|---|---|
| Styrene | 84 |
| Unsaturated Alkyd Resin | 5 |
| Buna S | 6 |
| Divinyl Benzene (crude) | 6 |

Immediately prior to use, 1 per cent of lauroyl peroxide was added to the mixture as a catalyst. The mixture had the consistency of a thin syrup and could easily be spread on glass, cloth, or other reinforcing materials by dipping or brushing.

Test sheets of the polymerized resin were made by heating the syrup between removable plates for 16 hours at 70° C. followed by 2 hours at 120° C. Some of the properties of the sheets were:

Tensile strength _____ 6400 p. s. i.
Impact strength—izod
  unnotched _____ 3.0 inch pounds
Hardness—Rockwell 15X _____ 84
Heat distortion _____ 86° C.
Power factor at
  1.0 megacycle _____ 0.13 per cent
Dielectric constant _____ 2.56

A panel was made by laminating 15 plies of glass fiber cloth (Fiberglas 0C-64), alternate plies cross-wise, applying 4 parts by weight of the foregoing resin-forming mixture for 6 parts of the cloth. The coated cloth was then cured for 0.5 hour at 150° F. under 20 p. s. i. pressure, followed by 0.5 hour at 300° F. under 60 p. s. i. pressure. The resulting laminate, which was about 0.15 inch thick, had a tensile strength of 41,000 to 46,000 p. s. i. and a bending modulus of 2,500,000 p. s. i. Its impact strength could not be measured by conventional methods, but the laminate easily stopped a 0.45 calibre bullet fired from a distance of 10 feet.

The Buna S of the laminating composition may be replaced by the GR–S butadiene-styrene copolymer.

*Example 5*

An electrical casting resin composition was prepared from styrene, an unsaturated alkyd resin, polyisobutylene (molecular weight 12,000), the chlorinated diphenyl resin Arochlor 5460, a crude divinyl benzene containing 40 per cent by weight of the latter, the balance being ethyl styrene, and p-tert.-butyl catechol as a storage inhibitor. The proportions were:

| Ingredient | Parts by Weight |
|---|---|
| Styrene | 47.2 |
| Unsaturated Alkyd Resin | 0.8 |
| Polyisobutylene | 23 |
| Arochlor 5460 | 23 |
| Divinyl Benzene (crude) | 6 |
| p-tert.-butyl-catechol | 0.005 |

Immediately before use, 1 per cent of lauroyl peroxide was added as a catalyst. The mixture is a syrup which is easily cast. It will set to a stiff gel in 2 hours at 50° C. and to a wax-like solid in 18 to 24 hours at the same temperature. Some of the properties of the solid resin are:

| | |
|---|---|
| Tensile strength | 1000 p. s. i. |
| Impact strength—izod unnotched | 2.0 inch-pounds |
| Hardness—Rockwell | 104—15X—60 |
| Heat distortion | 84° C. |
| Temperature at which resin flows under its own weight | Above 200° C. |
| Power factor at 1.0 megacycle | 0.13 per cent |
| Dielectric constant | 2.56 |

The low tensile strength is desirable since it permits ready removal of the cast resin from electrical equipment in case of trouble.

*Example 6*

Another electrical casting resin composition was prepared as follows:

| Ingredient | Parts by Weight |
|---|---|
| Styrene | 61.8 |
| Unsaturated Alkyd Resin | 1.2 |
| Buna S Rubber (soluble) | 6 |
| Arochlor 5460 | 26 |
| Divinyl Benzene (crude) | 5 |

This composition can be cured in a manner similar to that of the composition of Example 5, and on polymerization exhibits similar properties.

Other ways of applying the principle of the invention may be employed in addition to those described, change being made as regards the details disclosed, provided the method or composition recited in any of the following claims is used.

Attention is directed to our divisional application Serial No. 121,885 filed October 17, 1949 wherein there is claimed the resin forming compositions for making electric insulation disclosed but not claimed herein.

What is claimed is:

1. A resin-forming composition useful in laminating processes and consisting essentially of monomeric styrene, from 1 to 5 per cent by weight thereof of an unsaturated alkyd resin which contains the functional grouping

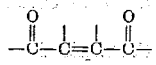

repeated along the poly ester chain and which has a molecular weight of at least 1000, from 2 to 15 per cent by weight of a butadiene-styrene copolymeric elastomer, and from 2 to 7 per cent of divinyl benzene.

2. A resin-forming composition useful in laminating processes and consisting essentially of a monomeric polymerizable nuclear monovinyl aromatic compound, from 0.5 to 10 per cent by weight thereof of an unsaturated alkyd resin which contains the functional grouping

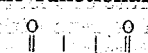

repeated along the poly ester chain and which has a molecular weight of at least 500, from 2 to 15 per cent by weight of a hydrocarbon elastomer, and from 1 to 10 per cent by weight of a polymerizable polyolefinic compound selected from the class consisting of divinyl benzene, diallyl phthalate, allyl acrylate, diallyl ether, and glycol diacrylate.

3. A resin-forming composition useful in laminating processes consisting essentially of a monomeric polymerizable nuclear monovinyl aromatic compound, from 0.5 to 10 per cent by weight thereof of a polymerization catalyst consisting of an unsaturated alkyd resin which contains the functional grouping

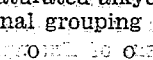

repeated along the poly ester chain, and from 2 to 15 per cent by weight of an elastomer.

4. A synthetic resin consisting essentially of the product of polymerization of the composition of claim 1.

5. A synthetic resin consisting essentially of the product of polymerization of the composition of claim 2.

6. A synthetic resin consisting essentially of the product of polymerization of the composition of claim 3.

LOUIS C. RUBENS.
RAYMOND F. BOYER.

REFERENCES CITED

The following references are of record in the file of this patent:

UNITED STATES PATENTS

| Number | Name | Date |
|---|---|---|
| 1,613,673 | Ostromislensky | Jan. 11, 1927 |
| 2,202,846 | Garvey et al. | June 4, 1940 |
| 2,356,965 | Allison | Aug. 29, 1944 |
| 2,443,735 | Kropa | June 22, 1948 |

FOREIGN PATENTS

| Number | Country | Date |
|---|---|---|
| 540,169 | Great Britain | Oct. 8, 1941 |